I. S. GRINDSTAFF & L. JOHNSON.
MAIZE HEADER AND CUTTER.
APPLICATION FILED DEC. 30, 1914.

1,196,355.

Patented Aug. 29, 1916.

Inventors
Isaac S. Grindstaff
Luke Johnson

Witnesses

UNITED STATES PATENT OFFICE.

ISAAC S. GRINDSTAFF AND LUKE JOHNSON, OF HASKELL, TEXAS.

MAIZE HEADER AND CUTTER.

1,196,355.  Specification of Letters Patent.  Patented Aug. 29, 1916.

Application filed December 30, 1914. Serial No. 879,714.

*To all whom it may concern:*

Be it known that we, ISAAC S. GRINDSTAFF and LUKE JOHNSON, citizens of the United States, residing at Haskell, in the county of Haskell and State of Texas, have invented certain new and useful Improvements in Maize Headers and Cutters, of which the following is a specification.

The implement which is the subject matter of the present application for patent is designed more particularly for cutting off the heads of Kafir corn or maize, and its object is to provide a simple and efficient hand-operated implement of this kind, which may be attached to each hand of the operator, leaving the index, middle finger and thumb free for handling the heads, and which is adjustable to fit different sized hands.

The herein stated object is attained by means of a combination and arrangement of parts to be hereinafter described and claimed, reference being had to the accompanying drawing, in which—

Figure 1:
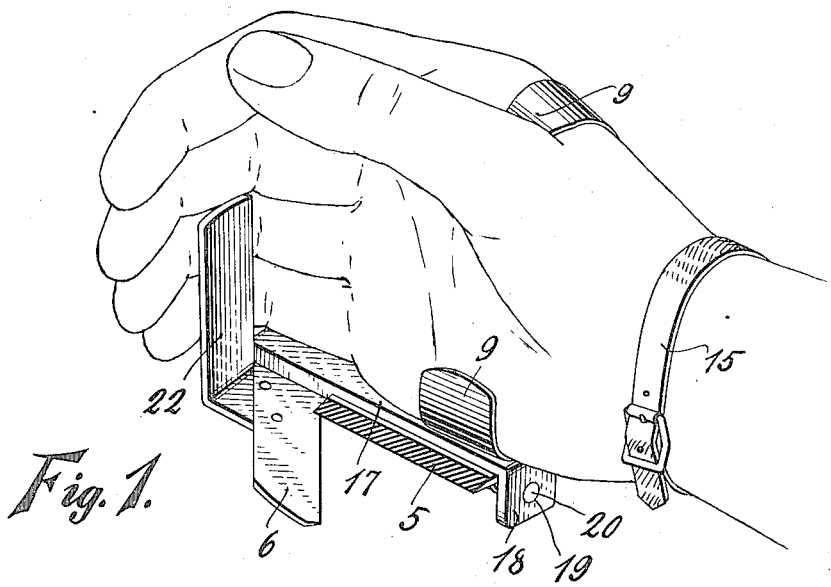
Figure 2:
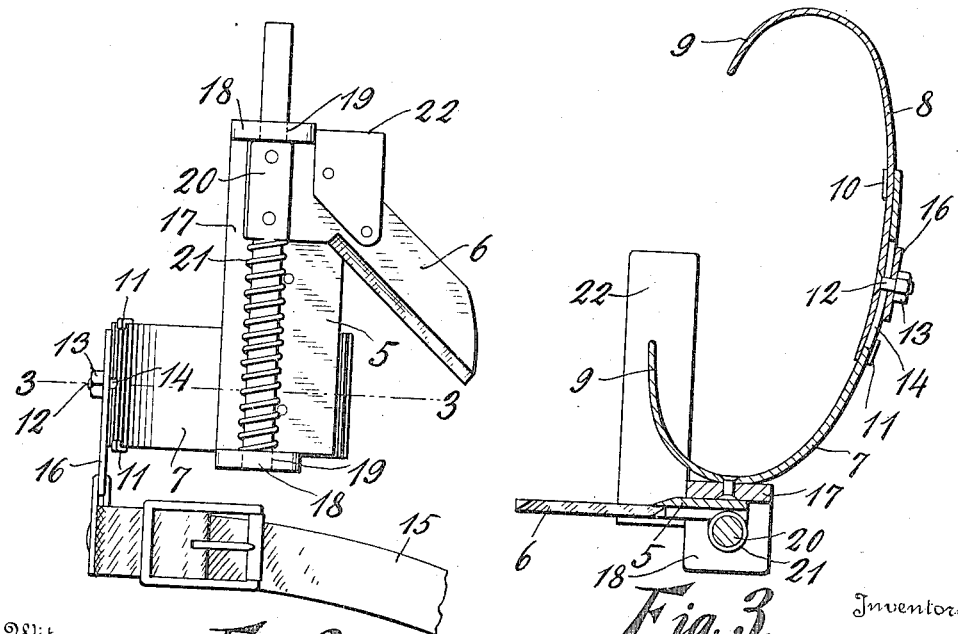
Figure 3:
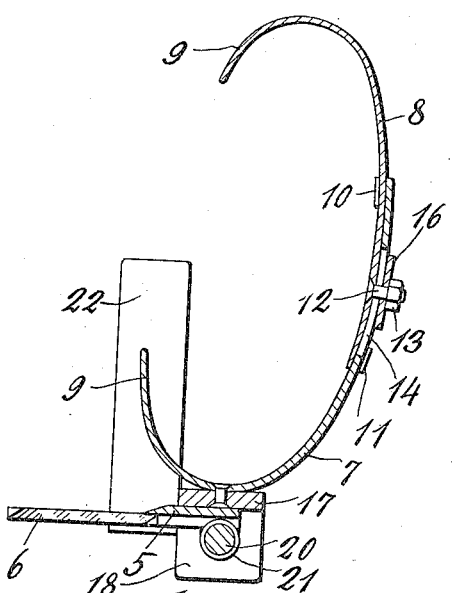

Figure 1 is a perspective view of the implement; Fig. 2 is a bottom plan view thereof, and Fig. 3 is a cross section on the line 3—3 of Fig. 2.

Referring specifically to the drawing, the implement comprises a stationary blade 5 and a movable blade 6 carried by a support which is arranged so that it may be attached to the hand of the operator. The support comprises two slidably connected bars 7 and 8, respectively, which are slightly curved in the direction of their length and have hook-shaped extremities 9. The bar 7 has tongues 10 which are bent over the edges of the bar 8, and the bar 8 has tongues 11 which are bent over the edges of the bar 7, thus providing guides which slidably connect the bars. This sliding connection between the bars enables the same to be spread according to the width of the operator's hand. The bars are fastened together in adjusted position by a bolt 12 and a nut 13 screwed thereon, one of the bars having a longitudinal slot 14 through which the bolt passes.

In use, the bars 7 and 8 are set to the width of the hand and the latter is inserted so that the bars come against the back of the hand and the hooks 9 over the side edges of the hand. The bars are secured by a strap 15 passed around the wrist. This strap is carried by a tongue 16 mounted on the bolt 12 under the nut 13. The bars are positioned on the hands far enough back of the fingers to leave the latter free to operate the blade 6.

To the hook-shaped extremity of the bar 7 is secured a bar 17 which extends laterally from one side thereof and has outward bends 18 at its ends provided with guide apertures 19 for a slidable rod 20 carrying the blade 6. The bar 17 also carries the blade 5. The blade 6 is set to extend at an oblique angle to the cutting edge of the blade 5 in order to obtain a shear cut. Between the butt end of the blade 6 and one of the bends 18 is located a return spring 21 for said blade, this spring being coiled around the rod 20. The blade 6 has an outstanding finger piece 22 for operating the same, said finger piece being in front of the bars 7 and 8 so as to be within easy reach of the operator's fingers.

In operation, the implement being mounted on the hand and secured thereto as hereinbefore described, the operator grasps the part 22 with the fingers and actuates the blade 6 to make a cut by a closing movement of the fingers. The spring 21 returns the blade for a new stroke, so that the operator is relieved of the necessity of retracting the blade after each stroke. The blade 6 works along the edge of the stationary blade 5, which edge is serrated as shown, to obtain a better cutting action. One end of the rod 20, and the aperture 19 through which it passes, are squared to prevent the blade 6 from swinging outward of the blade 5.

We claim:—

A cutting implement comprising a stationary blade, a movable blade coacting with the stationary blade, a supporting bar for the stationary blade, said bar having laterally extending portions at its extremities provided with guide apertures, a rod slidably mounted in said apertures and carrying the movable blade, means for attaching the supporting bar to the hand, and a finger piece for actuating the movable blade.

In testimony whereof we affix our signatures in presence of two witnesses.

ISAAC S. GRINDSTAFF.
LUKE JOHNSON.

Witnesses:
ALEX. EDWARDS,
H. I. HAMBLETON.